(12) United States Patent
Kingman et al.

(10) Patent No.: US 11,446,986 B1
(45) Date of Patent: Sep. 20, 2022

(54) REINFORCED VEHICLE WINDOW

(71) Applicants: David E. Kingman, Campbell, CA (US); Donald R. Monroe, Los Gatos, CA (US); Steven H. Klotz, Sunnyvale, CA (US); Derek C. Scott, Melbourne (AU)

(72) Inventors: David E. Kingman, Campbell, CA (US); Donald R. Monroe, Los Gatos, CA (US); Steven H. Klotz, Sunnyvale, CA (US); Derek C. Scott, Melbourne (AU)

(73) Assignee: Apple Inc., Cupertino, CA (US)

( * ) Notice: Subject to any disclaimer, the term of this patent is extended or adjusted under 35 U.S.C. 154(b) by 615 days.

(21) Appl. No.: 16/437,412

(22) Filed: Jun. 11, 2019

Related U.S. Application Data

(60) Provisional application No. 62/718,416, filed on Aug. 14, 2018.

(51) Int. Cl.
| | |
|---|---|
| *B60J 1/08* | (2006.01) |
| *B60J 10/76* | (2016.01) |
| *B60J 1/00* | (2006.01) |
| *B60J 5/04* | (2006.01) |
| *B62D 65/06* | (2006.01) |

(52) U.S. Cl.
CPC .............. *B60J 1/007* (2013.01); *B60J 1/08* (2013.01); *B60J 5/0402* (2013.01); *B60J 10/76* (2016.02); *B62D 65/06* (2013.01)

(58) Field of Classification Search
CPC ....... B60J 1/08; B60J 1/007; B60J 1/17; B60J 5/0402; B60J 10/76; B62D 65/06; B32B 17/10036
See application file for complete search history.

(56) References Cited

U.S. PATENT DOCUMENTS

| | | | | |
|---|---|---|---|---|
| 1,375,914 A | * | 4/1921 | Kimbark | B60J 1/17 49/462 |
| 3,162,281 A | * | 12/1964 | Gaulien | B60J 10/74 49/374 |
| 3,641,707 A | * | 2/1972 | Kellos | B60J 10/34 49/462 |
| 4,823,511 A | * | 4/1989 | Herliczek | B60J 10/74 428/83 |
| 4,901,476 A | * | 2/1990 | Nagashima | B32B 17/10036 49/475.1 |
| 4,910,074 A | * | 3/1990 | Fukawa | B32B 17/10018 428/215 |

(Continued)

FOREIGN PATENT DOCUMENTS

WO WO-2018123777 A1 * 7/2018 ............ B60J 1/02

*Primary Examiner* — Justin B Rephann
(74) *Attorney, Agent, or Firm* — Young Basile Hanlon & MacFarlane, P.C.

(57) ABSTRACT

A window assembly for a vehicle includes a laminated panel and a reinforcement structure. The laminated panel includes a glass layer and a polymer layer that is laminated with the glass layer. The reinforcement structure extends along and is coupled to an upper perimeter of the polymer layer. When the polymer layer is in tension, the reinforcement structure hinders inward movement of the polymer layer relative to an upper edge of the window assembly. The window assembly is a retractable side window assembly.

20 Claims, 5 Drawing Sheets

(56) References Cited

U.S. PATENT DOCUMENTS

| | | | | |
|---|---|---|---|---|
| 5,707,695 | A * | 1/1998 | Ramanujam | B32B 17/10018 |
| | | | | 428/122 |
| 6,364,397 | B1 * | 4/2002 | Bordeaux | B60J 1/10 |
| | | | | 296/146.2 |
| 6,886,881 | B1 * | 5/2005 | Henderson | B60J 1/08 |
| | | | | 296/146.2 |
| 9,027,985 | B2 * | 5/2015 | Kovie | B60J 1/17 |
| | | | | 296/187.03 |
| 9,156,334 | B1 | 10/2015 | Robins et al. | |
| 9,205,722 | B2 | 12/2015 | Sitko | |
| 9,920,566 | B1 * | 3/2018 | Bennett | E06B 1/26 |
| 10,314,116 | B1 * | 6/2019 | Kingman | H05B 3/84 |
| 11,034,136 | B2 * | 6/2021 | Mannheim Astete | |
| | | | | B32B 17/1077 |
| 11,186,146 | B1 * | 11/2021 | Kingman | B32B 17/10577 |
| 2004/0160688 | A1 * | 8/2004 | Noguchi | B32B 17/1055 |
| | | | | 359/883 |
| 2005/0002081 | A1 * | 1/2005 | Beteille | B32B 17/10064 |
| | | | | 359/275 |
| 2008/0032104 | A1 * | 2/2008 | Mannheim Astete | F41H 5/263 |
| | | | | 428/215 |
| 2009/0148642 | A1 | 6/2009 | Mauser et al. | |
| 2010/0212231 | A1 * | 8/2010 | Phillips | B60J 5/0402 |
| | | | | 49/502 |
| 2015/0047264 | A1 * | 2/2015 | Kobayashi | E06B 7/2314 |
| | | | | 49/440 |

* cited by examiner

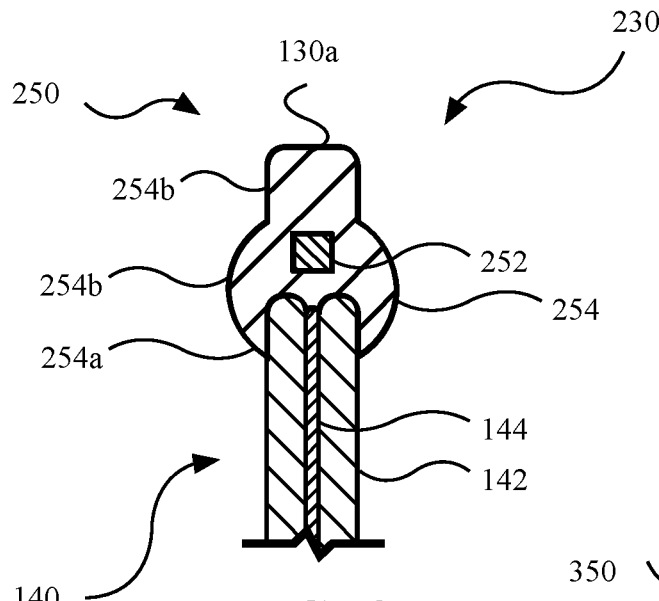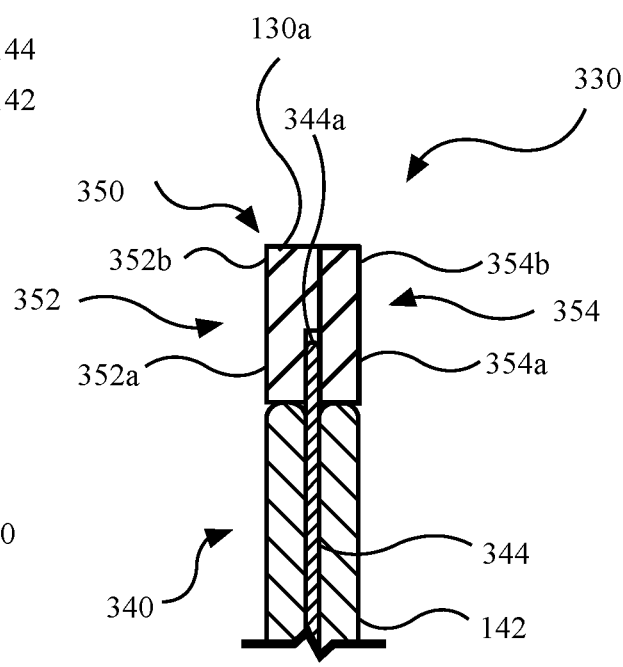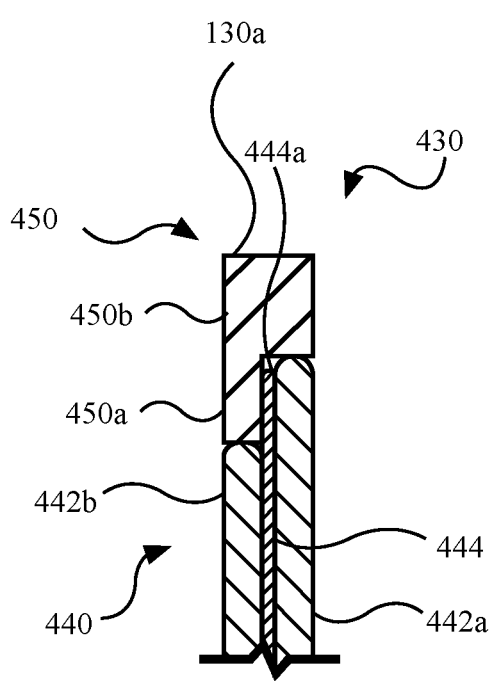
FIG. 2
FIG. 3
FIG. 4

US 11,446,986 B1

REINFORCED VEHICLE WINDOW

CROSS-REFERENCE TO RELATED APPLICATION(S)

This application claims priority to and the benefit of U.S. Provisional Application No. 62/718,416, filed Aug. 14, 2018, the entire disclosure of which is incorporated by reference herein.

TECHNICAL FIELD

This disclosure relates to windows and, in particular, retractable windows for passenger vehicles.

BACKGROUND

Passenger vehicles often include retractable side windows that allow passage of light into the vehicle and additionally allow passage of air into and out of the vehicle when opened. Such passenger vehicles also include side curtain airbag that, when deployed, may hinder objects moving from inside to outside the vehicle.

SUMMARY

Disclosed herein are implementations of window assemblies, window systems, and methods pertaining thereto.

In one implementation, a retractable side window assembly for a vehicle includes a laminated panel and a reinforcement structure. The laminated panel includes a glass layer and a polymer layer that is laminated with the glass layer. The reinforcement structure extends along and is coupled to an upper perimeter of the polymer layer. When the polymer layer is in tension, the reinforcement structure hinders inward movement of the polymer layer relative to an upper edge of the retractable side window assembly.

In another implementation, a vehicle system includes a frame and a window assembly. The frame defines a window opening and includes a channel extending along an upper perimeter of the frame. The window assembly is movable between a raised position and a lowered position. The window assembly includes a glass layer, a polymer layer, and a reinforcement structure. The polymer layer is laminated with the glass layer. The reinforcement structure is coupled to and extends along an upper perimeter of the polymer layer. In the raised position, the reinforcement structure is positioned in the channel.

In another implementation, a method includes installing into a vehicle a retractable side window assembly. The retractable side window assembly includes a glass layer, a polymer layer laminated with the glass layer, and a reinforcement structure coupled to the polymer layer and forming an upper edge of the retractable side window assembly. The upper edge is engageable with a seal of the vehicle. The method may also include removing a previously-installed retractable side window from the vehicle, which includes an upper edge engageable with the seal of the vehicle.

BRIEF DESCRIPTION OF THE DRAWINGS

FIG. 2 is a cross-sectional view of another embodiment of a window assembly.

FIG. 3 is a cross-sectional view of another embodiment of a window assembly.

FIG. 4 is a cross-sectional view of another embodiment of a window assembly.

DETAILED DESCRIPTION

Disclosed herein are embodiments of movable side window assemblies for vehicles. The movable side window assemblies may, in some conditions, hinder outboard movement of objects that impact the window assembly. More particularly, while conventional retractable side windows include glass panels having edges that form the outer periphery of the window and which directly engage a vehicle body structure when closed, the window assemblies disclosed herein include reinforcement structures that are coupled to and extend along the perimeter of a laminated panel. The reinforcement structures are coupled to a polymer layer of the laminated panel, so as to support the polymer layer to hinder outboard movement of the window assembly when impacted by an object in an outboard direction. By being coupled to and supporting the polymer layer, the reinforcement structure may hinder outboard movement of the window assembly even upon breaking or other loss of structural integrity of glass layers of the laminated panel.

Figure 1A:
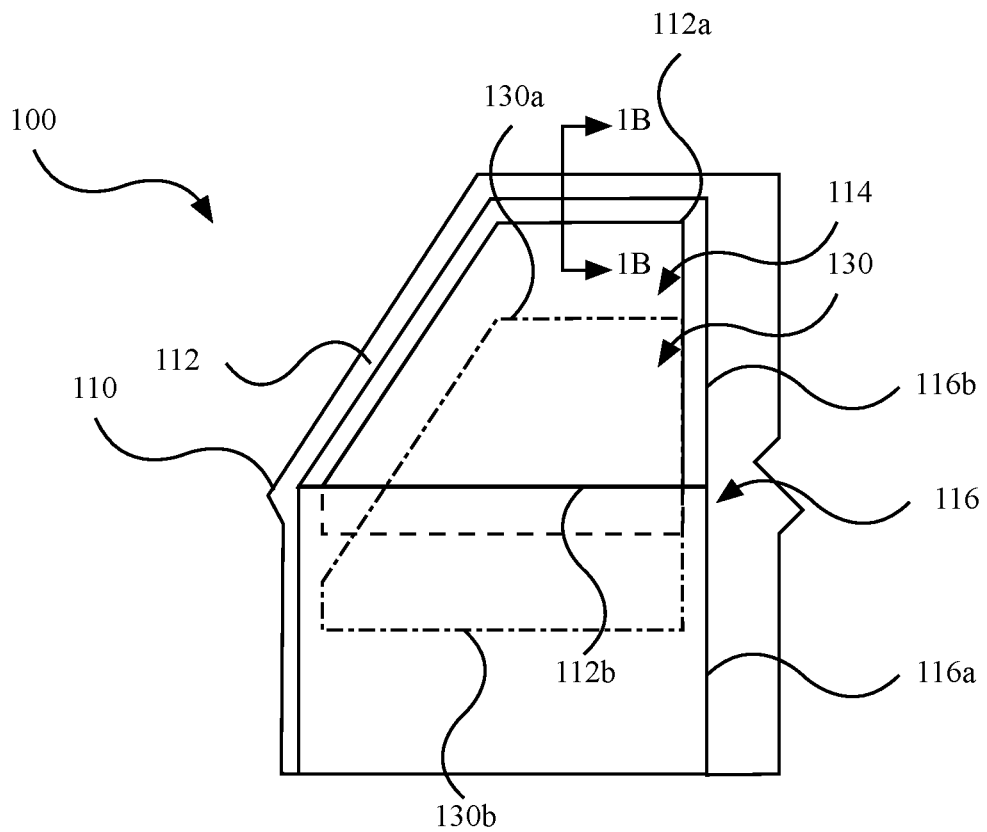
FIG. 1A is a partial side view of a vehicle having a window assembly.

Referring to FIG. 1A, a vehicle 100 includes a vehicle body 110 having a window frame 112 that defines a window opening 114, and also includes a window assembly 130. The window assembly 130 is movable (e.g., is retractable) by a movement mechanism (e.g., a window regulator; not shown) relative to the window frame 112 between a raised position (hidden portions depicted with dash-dash lines) and a lowered position (depicted entirely in phantom with dash-dot lines). The window assembly 130 closes the window opening 114 in the raised position with an upper edge 130a of the window assembly 130 engaging an upper perimeter 112a of the window frame 112. The window assembly 130 opens the window opening 114 in the lowered position with the upper edge 130a of the window assembly 130 being spaced below the upper perimeter 112a of the window frame 112 to form a vertical gap therebetween. The window assembly 130 may also be referred to as a retractable window assembly or a retractable side window assembly. The upper edge 130a of the window assembly 130 may be considered an edge of the window assembly 130 that is positioned above a belt line of the vehicle 100 when the window assembly 130 is in the raised (e.g., closed) position. The window frame 112 and the window assembly 130 may be considered to cooperatively form a vehicle system or a window system.

As referenced above, the window frame 112 of the vehicle body 110 defines the window opening 114 inward of the upper perimeter 112a and a lower perimeter 112b thereof. In the example shown in FIG. 1A, the window frame 112 is formed by a door 116. The door 116 includes a lower door portion 116a and an upper door portion 116b. The lower door portion 116a defines a cavity into which the window assembly 130 may be lowered (e.g., retracted), for example, between inner and outer panels of the lower door portion 116a. An upper end of the lower door portion 116a may be considered to form the lower perimeter 112b of the window frame 112. The upper end of the lower door portion 116a may be further considered to define the belt line of the vehicle 100. As used here, the directional terms of inward, outward, or similar may generally, though not exclusively, refer to positions and/or movement relative to the window frame 112, the window opening 114, and/or the window assembly 130. For example, the window opening 114 is defined inward of the window frame 112, since the window frame 112 generally surrounds the window opening 114.

The upper door portion 116b is, for example, the portion of the door 116 above a belt line of the vehicle 100 and forms an upper portion of the window frame 112. The upper door portion 116b extends upward from forward and rearward ends of the lower door portion 116a, so as to form the upper perimeter 112a of the window frame 112. As a result, the window opening 114 is defined generally above the lower door portion 116a and below and between the upper door portion 116b, which cooperatively form the window frame 112. The upper perimeter 112a of the window frame 112 may be considered that positioned above the belt line of the vehicle 100. Further, the upper perimeter 112a may be considered to include a forward portion (e.g., extending upward from the forward end of the lower door portion 116a), a rearward portion (e.g., extending upward from the rearward end of the lower door portion 116a), and an upper portion (e.g., extending between the front and rear portions above and spaced apart from the lower perimeter 112b of the window frame 112).

Alternatively, the window frame 112 and the window opening 114 defined thereby may be formed by other portions of the vehicle 100. For example, the upper perimeter 112a of the window frame 112 may instead be formed by a fixed portion of the vehicle body 110 of the vehicle (e.g., pillar and/or roof structures thereof), and/or the lower perimeter 112b may be formed by another fixed portion of the vehicle body 110 (e.g., by fixed panels or other structures thereof).

The window frame 112 laterally supports the window assembly 130 around the upper perimeter 112a, so as to hinder outboard and/or inboard movement of the window assembly 130 relative to the window frame 112 when lateral force is applied thereto. When the window assembly 130 is in the raised position, edges thereof engage the window frame 112. For example, the upper edge 130a of the window assembly 130 engages the upper perimeter 112a of the window frame 112. A lower edge 130b of the window assembly 130 may be positioned below the belt line (e.g., being contained in the lower door portion 116a of the door 116), such that the lower perimeter 112b of the window frame 112 engages or is otherwise adjacent central surface of the window assembly 130 when in the raised position. The upper edge 130a of the window assembly 130 may be considered to include a forward portion (e.g., extending upward at a forward end thereof), a rearward portion (e.g., extending upward from a rearward thereof), and an upper portion (e.g., extending between the front and rear portions above and spaced apart from the lower edge 130b of the window assembly 130). The forward, rearward, and upper portions of the upper edge 130a engage the forward, rearward, and upper portions of the upper perimeter 112a of the window frame 112. As used herein, the directional terms of lateral, inboard, outboard, or similar generally refer to positions and/or movement relative to a forward direction of travel of the vehicle 100. For example, an outboard force may be applied in a leftward direction from inside the vehicle 100 against a window assembly 130 of a left side.

Figure 1C:
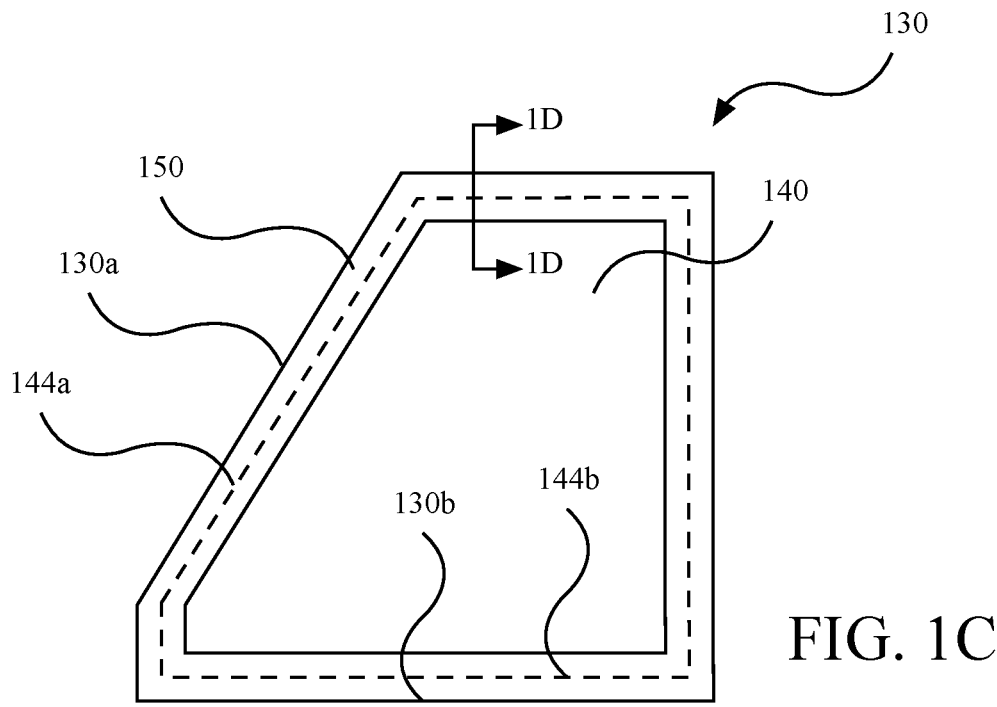
FIG. 1C is a side view of the window assembly of the vehicle shown in FIG. 1A.
Figure 1B:
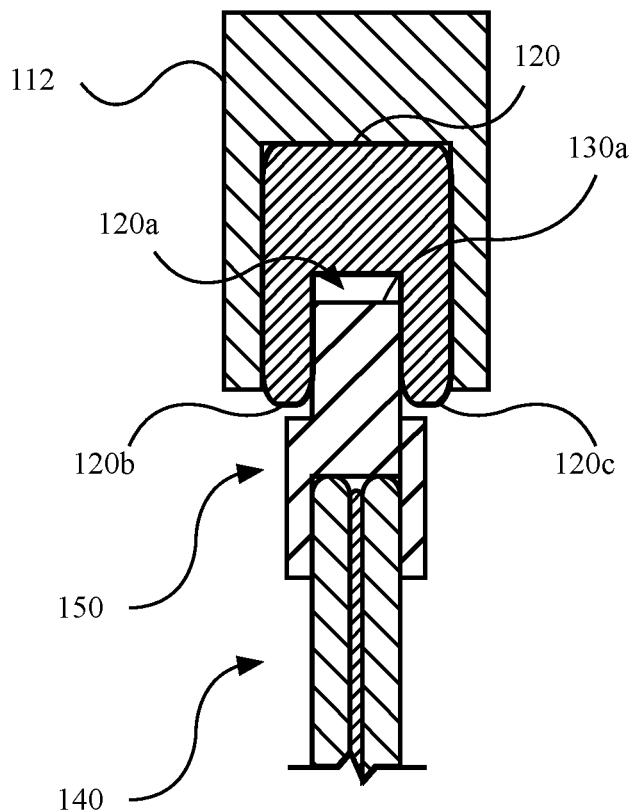
FIG. 1B is a cross-sectional view of the vehicle taken along line 1A-1A in FIG. 1A.

Referring additionally to the cross-sectional view of FIG. 1B, the window frame 112 includes a seal 120 that extends along and forms the upper perimeter 112a of the window frame 112. The seal 120 is fixedly coupled to the vehicle body 110, such as to the upper door portion 116b. As a result, lateral force applied to the window assembly 130 is transferred to the vehicle body 110 via the seal 120.

The seal 120 forms a channel 120a (e.g., a recess), which receives the upper edge 130a of the window assembly 130. The seal 120, for example, includes two seal members 120b on inboard and outboard sides of the window assembly 130. When the window assembly 130 is in the raised position, the seal member 120b on the inboard side engages an inboard surface of the window assembly 130, while the seal member 120b on the outboard side engages an outboard surface of the window assembly 130, so as to prevent intrusion of water through the window opening 114. The seal 120 transfers lateral force to portion of the vehicle body 110 forming the window frame 112, for example, by itself including rigid components and/or by being positioned laterally adjacent (e.g., between) rigid structures of the vehicle body 110 (e.g., in a channel of the window frame 112, as shown). While the seal 120 is depicted as a unitary member that includes the two seal members 120b, the seal members 120b may instead be separately formed and coupled to each other or coupled independently to the vehicle body 110 (e.g., to the upper door portion 116b).

Figure 1D:
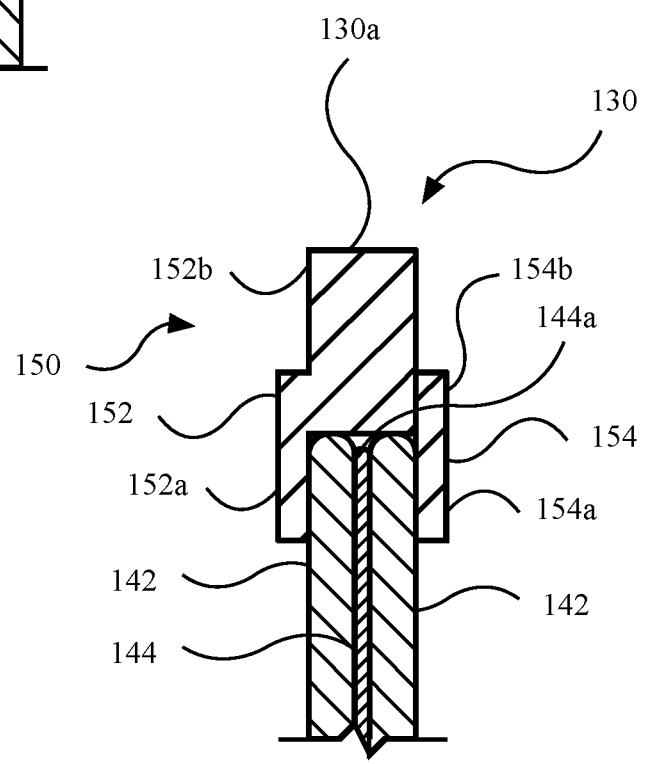
FIG. 1D is a cross-sectional view of the window assembly taken along line 1D-1D in FIG. 1C.

Referring additionally to FIGS. 1C-1D, the window assembly 130 generally includes a laminated panel 140 and a reinforcement structure 150. The reinforcement structure 150 functions to hinder lateral movement of the laminated panel 140 relative to the window frame 112 upon application of an outboard force to the laminated panel 140. Such an outboard force may be that from an object inside the vehicle impacting and/or pressing against the laminated panel 140 of the window assembly 130. For example, the lateral force may be force applied during a testing protocol, such as Federal Motor Vehicle Safety Standard 226, in which an ejection impactor (i.e., a head form having a mass of 18 kg, being formed of aluminum with a skin covering, and having a shape of a head) impacts a window at between 16 km/h and 20 km/h. FMVSS 226 may be satisfied if lateral movement of the window in a pre-broken form is 100 mm or less upon application of the ejection impactor. The laminated panel 140 may also be referred to as a laminated glazing panel. The reinforcement structure 150 may also be referred to as a panel frame, a glazing frame, a reinforcement frame, or a peripheral frame.

To hinder lateral movement of the laminated panel 140, the reinforcement structure 150 hinders movement of the upper edge 130a inward toward a central portion of the laminated panel 140 and/or outboard movement of the laminated panel 140 relative to the window frame 112. More particularly, the laminated panel 140 includes one or more glass layers 142 and a polymer layer 144 that is laminated with the one or more glass layers 142. The reinforcement structure 150 is coupled to the polymer layer 144 along an upper perimeter 144a and a lower perimeter 144b thereof, and hinders inward movement of the polymer layer 144 (i.e., toward a central region of the window opening 114) and/or outboard movement of the polymer layer 144 relative to the window frame 112.

By being coupled to the polymer layer 144 along the upper perimeter 144a thereof, the reinforcement structure 150 supports the polymer layer 144 in event of the one or more glass layers 142 breaking (e.g., shattering). For example, as outboard force is applied to the polymer layer 144, the polymer layer 144 may tend to be drawn inward (i.e., toward the central region of the window opening 114), which is resisted by the reinforcement structure 150 being coupled to the upper perimeter 144a thereof. Thus, as the outboard force is applied to the window assembly 130 and places the polymer layer 144 in tension between portions of the reinforcement structure 150, the reinforcement structure 150 hinders inward movement of the polymer layer 144 by holding the polymer layer 144 in tension. The reinforcement structure 150 additionally engages the window frame 112 to transfer force thereto and/or to be supported thereby. For example, the reinforcement structure 150 may form the upper edge 130a of the window assembly 130, which is received by the seal 120 along the upper perimeter 112a of the window frame 112. As the outboard force applied to the laminated panel 140, the window frame 112 applies a reactive force to the reinforcement structure 150 in an inboard direction, so as to hinder outboard movement of the polymer layer 144 of the laminated panel 140. Further, increased friction between the reinforcement structure 150 and the window frame 112 results from the outboard force and reactive inboard force, which may further resist movement of the upper edge 130a inward from the upper perimeter 112a of the window frame 112 toward the central region of the window opening 114.

The one or more glass layers 142 of the laminated panel 140 may be formed of any suitable glass material. The polymer layer 144 may, for example, include one or more layers of polyvinyl butyral (PVB). The one or more glass layers 142 and the polymer layer 144 are, for example, bonded to each other during an autoclave process. Further, while the reinforcement structure 150 is depicted as extending along the lower perimeter 144b of the polymer layer 144, the reinforcement structure 150 may be omitted therealong and/or in regions below the beltline.

Referring to FIG. 1B and FIG. 1D, the reinforcement structure 150 is coupled to opposing surfaces of the glass layers 142 of the laminated panel 140. By being coupled to the glass layers 142, the reinforcement structure 150 is indirectly coupled to the polymer layer 144 of the laminated panel 140 (e.g., being layered therewith). The reinforcement structure 150 additionally extends outward of the upper perimeter 144a of the polymer layer 144 of the laminated panel 140, so as to form the upper edge 130a of the window assembly 130.

The reinforcement structure 150 generally includes a first structural member 152 and a second structural member 154. Each of the first structural member 152 and the second structural member 154 is elongated and extends along the upper perimeter 144a of the polymer layer 144 of the laminated panel 140. The first structural member 152 and the second structural member 154 are coupled to surfaces of the glass layers 142 and are, thereby, coupled indirectly to the polymer layer 144. For example, the first structural member 152 includes an inner portion 152a and the second structural member 154 includes an inner portion 154a, which extend inward relative to the upper edge 130a and are coupled to surfaces of the glass layers 142 on opposing sides thereof. As a result, the laminated panel 140, including the glass layers 142 and the polymer layer 144, is positioned between the first structural member 152 and the second structural member 154 (e.g., in a channel or recess formed thereby) along the upper perimeter 144a of the polymer layer 144 of the laminated panel 140. The inner portions 152a, 154a extend inward (i.e., relative to the upper edge 130a) along the surfaces of the glass layers 142 a suitable distance to facilitate coupling thereto (e.g., greater than one time or two times a thickness of the laminated panel 140), for example, with an adhesive (e.g., urethane). The inner portion 152a of the first structural member 152 and the inner portion 154a of the second structural member 154 may also be referred to as flanges.

The first structural member 152 and the second structural member 154 additionally extend outward from the upper perimeter 144a of the polymer layer 144 of the laminated panel 140 and are coupled to each other. For example, the first structural member 152 includes an outer portion 152b that is coupled to the inner portion 152a (e.g., being formed integrally therewith) and extends outward therefrom toward the upper edge 130a. The second structural member 154 includes an outer portion 154b that is coupled to the inner portion 154a (e.g., being formed integrally therewith) and extends outward therefrom (i.e., toward the upper edge 130a of the window assembly 130). One or both of the outer portion 152b or the outer portion 154b extend laterally toward each other to accommodate the thickness of the laminated panel 140 and be coupled to each other. For example, as shown, the outer portion 152b of the first structural member 152 extends laterally toward the outer portion 154b of the second structural member 154 a distance approximately equal to the thickness of the laminated panel 140.

The reinforcement structure 150, as referenced above, forms the upper edge 130a of the window assembly 130 and is further configured to engage the window frame 112, for example, being received in the channel 120a of the seal 120. As shown, the reinforcement structure 150 narrows moving outward toward the upper edge 130a, such that the upper edge 130a has a thickness that is approximately the same as that of the laminated panel 140. That is, the reinforcement structure 150 has a thickness that is greater where coupled to the laminated panel 140 and lesser where forming the upper edge 130a. As a result of the reinforcement structure 150 reducing in thickness to that of the laminated panel 140, the window assembly 130 may engage the seal 120 in the same manner in which another window lacking the reinforcement structure 150 would otherwise engage the seal 120. This may be particularly advantageous when retrofitting an existing vehicle, or modifying the design of an existing vehicle, since the window frame 112 and the seal 120 do not require further modification or redesign to receive and engage the window assembly 130.

The first structural member 152 and the second structural member 154 may be formed a metal material (e.g., steel, aluminum, or alloys thereof), a fiber-composite material (e.g., a glass- or carbon-fiber filled polymer), or other suitable material. The first structural member 152 and the second structural member 154 may be formed according to any suitable manufacturing method, such as with stamping or extruding and bending (e.g., with a metal material) or injection molding (e.g., with the fiber-composite material). The metal material, the fiber-composite material, or the other suitable material forming the first structural member 152 and/or the second structural member 154 may, for example, have greater ductility than the glass layers 142, so as to continue supporting the polymer layer 144 even after breakage of the glass layers 142.

As referenced above, the reinforcement structure 150, including each of the first structural member 152 and the second structural member 154, is coupled to the glass layers 142, for example, with a suitable adhesive (e.g., urethane adhesive). As a result, the reinforcement structure 150 (e.g., each of the first structural member 152 and the second structural member 154) is indirectly coupled to the polymer layer 144 via the glass layers 142 In the case of being formed of a fiber-composite material having a similar coefficient of thermal expansion to the glass layers 142, the first structural member 152 and/or the second structural member 154 may be coupled to the polymer layer 344 during an autoclave process during which the glass layers 142 and the polymer layer 144 are laminated and bonded to each other.

Referring to FIG. 2, a window assembly 230 is an alternative to the window assembly 130 and generally includes the laminated panel 140 (as described previously) and a reinforcement structure 250 coupled to and extending along the upper perimeter 144a of the polymer layer 144 of the laminated panel 140.

The reinforcement structure 250 is coupled to the opposing surfaces of the glass layers 142 and is, thereby, coupled indirectly to the polymer layer 144. The reinforcement structure 250 generally includes an internal member 252 and an external member 254 that surrounds (e.g., contains, encapsulates) the internal member 252.

The internal member 252 is a structural member, which imparts parts strength to the window assembly 130 by hindering inward movement (e.g., from the upper edge 130a inward to the window opening 114) and/or outboard movement of the polymer layer 144. The internal member 252 is coupled to the laminated panel 140 by the external member 254 and is positioned outward of the upper perimeter 144a of the polymer layer 144. The internal member 252 is formed of a metal material (e.g., steel or aluminum) or a fiber-composite (e.g., carbon- or glass-filled resin or nylon) according to any suitable method or combination thereof (e.g., stamping, extruding, machining, molding). As shown, the internal member 252 has a generally rectangular cross-sectional shape that may be constant along the upper edge 130a of the window assembly 130, but may have any other suitable shape (e.g., circular, ovoid, convoluted) and/or vary along the upper edge 130a.

The external member 254 couples the internal member 252 to the laminated panel 140 and additionally forms the upper edge 130a of the window assembly 130. The external member 254 generally includes two inner portions 254a, a central portion 254b, and an outer portion 254c.

The inner portions 254a of the external member 254 are coupled to the laminated panel 140. For example, the inner portions 254a cooperatively define a recess in which is received the laminated panel 140, including the glass layers 142 and the polymer layer 144. The two inner portions 254a are each coupled to the surface of one of the glass layers 142, for example, with a suitable adhesive. The inner portions 254a may also be referred to as flanges.

The central portion 254b of the external member 254 is coupled to and positioned outward of the two inner portions 254a, for example, being formed integrally therewith. The central portion 254b is coupled to and surrounds (e.g., contains) the internal member 252. The external member 254 may have a thickness that is greater at the central portion 254b than at the inner portions 254a, so as to accommodate the internal member 252.

The outer portion 254c of the external member 254 is coupled to and positioned outward of the central portion 254b, for example, being formed integrally therewith. The outer portion 254c forms the upper edge 130a of the window assembly 130 and is configured to engage the window frame 112, such as the seal 120 thereof. The thickness of the external member 254 at the outer portion 254c may be the same as the thickness of the laminated panel 140, for example, narrowing from the central portion 254b, such that the upper edge 130a formed thereby may engage the window frame 112 as described previously (e.g., being received in the channel 120a of the seal 120).

The external member 254 is formed of a polymer material, such as a rubber or plastic material. The external member 254 may be formed according to any suitable method, such as extruding (e.g., being co-extruded with the internal member 252) or molding (e.g., overmolding with the internal member 252 therein). The external member 254 and, in particular, the inner portions 254a is coupled to the laminated panel 140 with a suitable adhesive (e.g., a urethane adhesive).

Referring to FIG. 3, a window assembly 330 is an alternative to the window assembly 130 and generally includes a laminated panel 340 and a reinforcement structure 350 coupled to and extending along an upper perimeter 344a of a polymer layer 344 of the laminated panel 340. As compared to the reinforcement structures 150, 250, which are coupled to the polymer layer 144 via the glass layers 142, the reinforcement structure 350 is instead coupled to the polymer layer 344 independent of the glass layers 142. The laminated panel 340 is a variant of the laminated panel 140 and includes the glass layers 142 (as described previously) and the polymer layer 344 that extends outward beyond edges of the glass layers 142, such that an upper perimeter 344a of the polymer layer 344 is positioned outward of the glass layers 142.

The reinforcement structure 350 generally includes a first structural member 352 and a second structural member 354, which are elongated and extend along the upper perimeter 344a of the laminated panel 140. The first structural member 352 and the second structural member 354 are coupled to the polymer layer 144 without the glass layers 142 therebetween. For example, the first structural member 352 includes an inner portion 352a and the second structural member 354 includes an inner portion 354a, which extend inward of the upper edge 130a of the window assembly 330 and are positioned outward of (e.g., adjacent to) edges of the glass layers 142. The inner portion 352a of the first structural member 352 and the inner portion 354a of the second structural member 354 are coupled to opposing sides of the polymer layer 344 along the upper perimeter 344a thereof in a suitable manner, for example, being bonded thereto or adhered thereto. As a result, the polymer layer 344, but not the glass layers 142, is coupled to and positioned between the first structural member 352 and the second structural member 354 (e.g., in a recess or a channel cooperatively formed thereby) along the upper perimeter 344a of the polymer layer 344 of the laminated panel 340. The inner portions 352a, 354a extend inward (i.e., relative to the upper edge 130a) along opposing surfaces of the polymer layer 344 a suitable distance for coupling thereto. The inner portions 352a, 354a of the first and second structural members 352, 354 may also be referred to as flanges.

The first structural member 352 and the second structural member 354 additionally extend outward form the upper perimeter 344a of the polymer layer 344 and are coupled to other. For example, the first structural member 352 additionally includes an outer portion 352b that is coupled to the inner portion 352a (e.g., being formed integrally therewith) and extends outward therefrom toward the upper edge 130a of the window assembly 330. The second structural member 354 includes an outer portion 354b that is coupled to the inner portion 354a (e.g., being formed integrally therewith) and extends outward therefrom. One of both of the outer portions 352b, 354b may additionally extend laterally toward each other to accommodate the thickness of the polymer layer 344. Alternatively, the first structural member 352 and the second structural member 354 may be coextensive with the polymer layer 344.

The reinforcement structure 350 forms the upper edge 130a of the window assembly 130, for example, being formed by one, the other, or both of the first structural member 352 and the second structural member 354. By being positioned outward of the glass layers 142, the reinforcement structure 350 may have a thickness that is substantially equal to the thickness of the laminated panel 140, for example, with the inner portions 352a, 354a of the first and second structural members 352, 354 having substantially the same thickness as the glass layers 142. Thus, the window assembly 330 may have a substantially constant thickness in central regions of the laminated panel 140 and in regions of the reinforcement structure 350. As a result, the reinforcement structure 350 may engage the window frame 112 (e.g., the seal 120 thereof) in substantially the same manner as a window without the reinforcement structure 350. Furthermore, the reinforcement structure 350, by not being thicker than the laminated panel 340, may be substantially hidden within the channel 120a of the seal 120.

The first structural member 352 and the second structural member 354 may be formed of a metal material (e.g., steel, aluminum, or alloys thereof), a fiber-composite material (e.g., a glass- or carbon-fiber filled polymer), or other suitable material, by any suitable method.

The first structural member 352 and the second structural member 354 are coupled to the polymer layer 344 in any suitable manner, for example, with a suitable adhesive for adhering the material of the first structural member 352 and the second structural member 354 to the material of the polymer layer 344 or being bonded thereto. In the case of being formed of a fiber-composite material having a similar coefficient of thermal expansion to the glass layers 142, the first structural member 352 and the second structural member 354 may be coupled to the polymer layer 344 during an autoclave process during which the glass layers 142 and the polymer layer 344 are laminated and bonded to each other. If the first structural member 352 and the second structural member 354 are coupled to the polymer layer 344 after the autoclave process, the exposed portion of the polymer layer 344 (e.g., the upper perimeter 344a) may be protected with a covering, such as a release liner of a suitable material, that prevents flowing of the material of the polymer layer 344 under high temperatures of the autoclave process.

Referring to FIG. 4, a window assembly 430 is an alternative to the window assembly 130 and generally includes a laminated panel 440 and a reinforcement structure 450 coupled to and extending along an upper perimeter 444a of a polymer layer 444 of the laminated panel 440. The laminated panel 440 is a variant of the laminated panel 140 and includes a first glass layer 442a, a second glass layer 442b, and the polymer layer 444. While the glass layers 142 and the polymer layer 144 of the laminated panel 140 may be generally coextenstive, the first glass layer 442a and the polymer layer 444 extend beyond the edge of the second glass layer 442b. The reinforcement structure 450 is coupled to one surface of the polymer layer 444 opposite the first glass layer 442a independent of the first glass layer 442a and the second glass layer 442b (e.g., without either of the first glass layer 442a and the second glass layer 442b therebetween). As a result, the polymer layer 444 is located between the reinforcement structure 450 and the first glass layer 442a.

The reinforcement structure 450 is generally L-shaped structural member having an inner portion 450a and outer portion 450b. The inner portion 450a is coupled to a surface the polymer layer 444 and is positioned adjacent to and extends outward of the second glass layer 442b. The inner portion 450a has a thickness approximately equal to that of the second glass layer 442b, such that the window assembly 430 has a thickness that is the same in a central region (e.g., the thickness of the laminated panel 440) as in a region of the inner portion 450a of the reinforcement structure 450.

The outer portion 450b of the reinforcement structure 450 is coupled to and extends outward of the inner portion 450a (e.g., being formed integrally therewith). The outer portion 450b additionally extends laterally across an upper edge of the first glass layer 442a. The outer portion 450b has a thickness approximately equal to that of the laminated panel 440, such that the thickness of the window assembly 430 is the same in the central region (e.g., the thickness of the laminated panel 440) as in a region of the outer portion 450b of the reinforcement structure 450. As a result, the upper edge 130a formed by the reinforcement structure 450 may engage the window frame 112 (e.g., the seal 120 thereof) in substantially the same manners as a window without the reinforcement structure 450.

The reinforcement structure 450 is, for example, formed as a unitary member comprising both the inner portion 450a and the outer portion 450b. The reinforcement structure 450 may be formed of a metal material (e.g., steel, aluminum, or alloys thereof), a fiber-composite material (e.g., a glass- or carbon-fiber filled polymer), or other suitable material, by any suitable method. Alternatively, the reinforcement structure 450 may be formed of multiple components that are fixed to each other.

The reinforcement structure 450 is coupled to the polymer layer in any suitable manner, for example, with a suitable adhesive for adhering the material thereof to the material of the polymer layer 444. As referenced above with respect to the reinforcement structure 350, the reinforcement structure 450 may be coupled to the polymer layer 444 during the autoclave process (e.g., when formed of a composite-fiber material having similar coefficient of thermal expansion to the glass layers 442a, 442b) or after the autoclave process.

Figure 5:
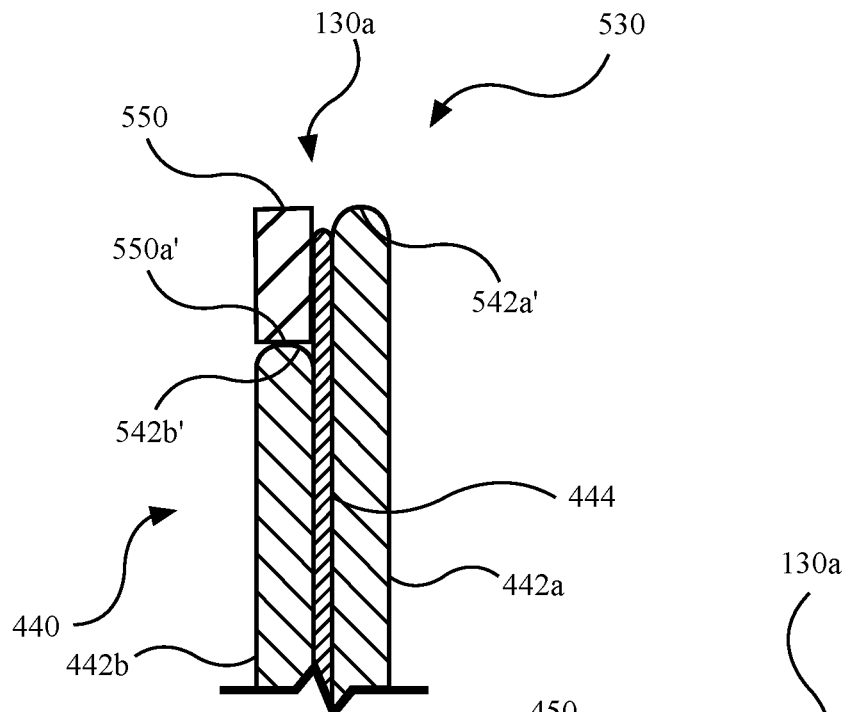
FIG. 5 is a cross-sectional view of another embodiment of a window assembly.

Referring to FIG. 5, a window assembly 530 includes the laminated panel 440 and reinforcement structure 550 that cooperatively form the upper edge 130a of window assembly 530. For example, the first glass layer 442a of the laminated panel 440 forms one of the inboard or outboard surface of the laminated panel 440 and engages the seal 120, while the reinforcement structure 550 forms the other of the inboard or the outboard surface of the window assembly 530 and engages the seal 120.

The reinforcement structure 550 is positioned outward of and adjacent to an outer edge 542b' of the second glass layer 442b and extends outward therefrom to be coextensive with an outer edge 542a' of the first glass layer 442a. The reinforcement structure 550 has a thickness approximately equal to that of the second glass layer 442b, such that the window assembly 530 may have substantially the same thickness in a central region (e.g., of the laminated panel 440) as in a region with the reinforcement structure 550.

The reinforcement structure 550 is coupled to the polymer layer 444 in any suitable manner, for example, with a suitable adhesive for adhering the material thereof to the material of the polymer layer 444 or being bonded thereto, as described above.

Figure 6:
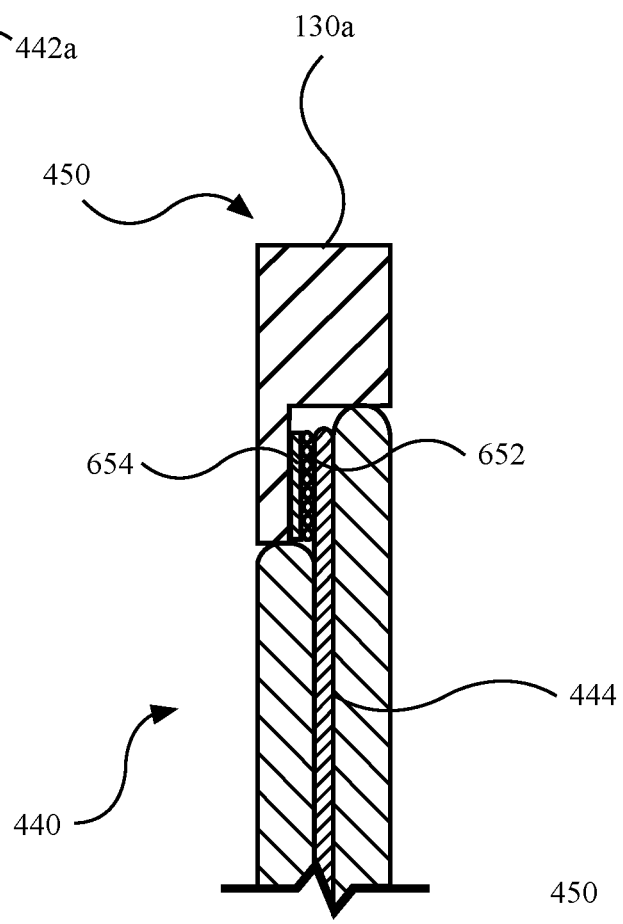
FIG. 6 is a cross-sectional view of another embodiment of a window assembly.
Figure 7:
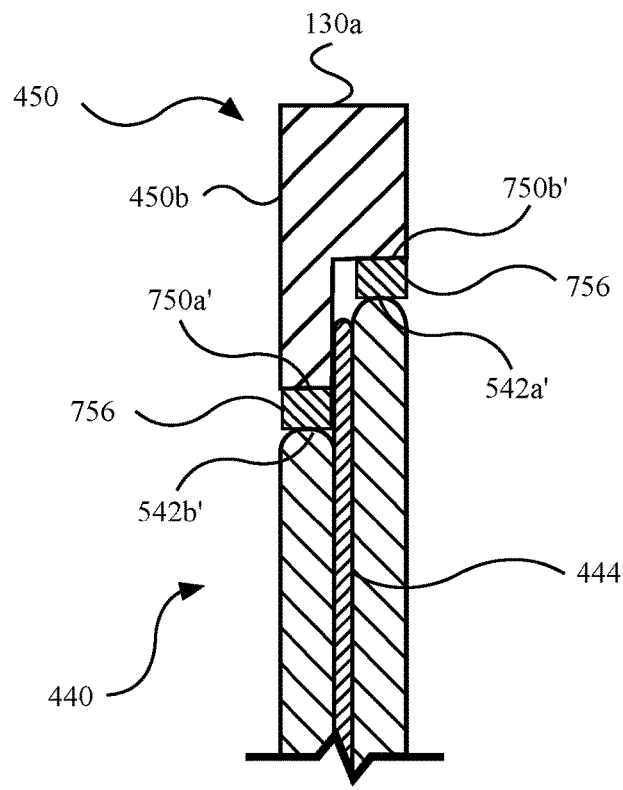
FIG. 7 is a cross-sectional view of another embodiment of a window assembly.
Figure 8:
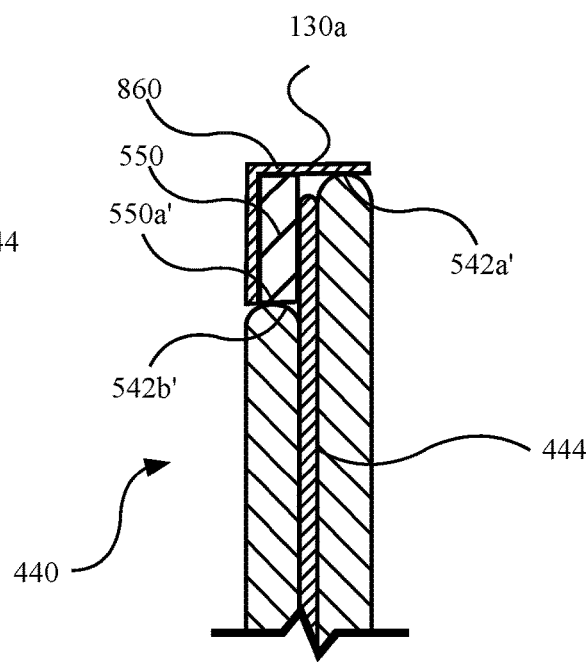
FIG. 8 is a cross-sectional view of another embodiment of a window assembly.

Referring to FIGS. 6-8, the reinforcement structures 150, 250, 350, 450, 550 may be configured with variations and/or additional features described.

Referring to FIG. 6, reinforcement structures that are coupled to the polymer layer without the glass layer therebetween may be bonded to the polymer layer, for example, as with the reinforcement structures 350, 450, and 550. Using the reinforcement structure 450 as an example, the reinforcement structure 450 includes a glass bonding layer 652 that is coupled thereto, for example, with an adhesive layer 654. The glass bonding layer 652 is formed of glass, such as glass fibers that individually and/or cooperatively extend therealong (e.g., along the upper perimeter 444a of the polymer layer 444). The glass bonding layer 652 is bonded directly to the polymer layer 444, for example, during an autoclave process.

Referring to FIG. 7, reinforcement structures that are adjacent glass layers may be spaced outward therefrom, as with the reinforcement structures 150, 350, 450, 550. Using the reinforcement structure 450 again as an example, the inner edge 750a' of the inner portion 450a of the reinforcement structure 450 is spaced outward of the outer edge 542b' of the second glass layer 442b to form a gap therebetween. Instead or additionally, an inner edge 750b' of the outer portion 450b of the reinforcement structure 450 is spaced outward of the outer edge 542a' of the first glass layer 442a to form another gap therebetween. The gaps may be left empty (e.g., forming an air gap) or may be filled with a polymeric material 756 (e.g., an elastic material, such as a urethane, as shown), which accommodates relative movement between the reinforcement structure 450 and the first glass layer 442a and the second glass layer 442b, for example, arising from differences in coefficients of thermal expansion. The polymeric material 756 may, for example, be applied as a viscous material that is subsequently cured or may be a formed member that is subsequently coupled (e.g., adhered) to the window assembly 430.

Referring to FIG. 8, for reinforcement structures that include structural members coupled directly to the laminated panel, such as with the reinforcement structures 150, 350, 450, and 550, may further include a cover. Using the reinforcement structure 550 as an example, the reinforcement structure 550 includes a cover 860. The cover 860 covers the reinforcements structure 550 from view and/or from contact. The cover 860 may also form the upper edge 130a of the window assembly 430. As shown, the cover 860 extends outward over the reinforcement structure 550 toward the upper edge 130a and laterally (e.g., inboard) across the outer edge 542a' of the first glass layer 442a. The cover 860, though shown as terminating generally at the surface of the first glass layer 442a, may additionally extend inward from the upper edge 130a over the first glass layer 442a.

The cover 860 is, for example, formed of a polymer material. The cover 860 may be provided as a member that is coupled to the window assembly 130 (e.g., after the reinforcement structure 550 is coupled to the laminated panel 440), or may be otherwise formed and/or applied to the window assembly 130. The cover 860 may also be considered part of the reinforcement structure 586 may also be considered part of the reinforcement structure 150, 350, 450, 550 coupled thereto.

Figure 9:
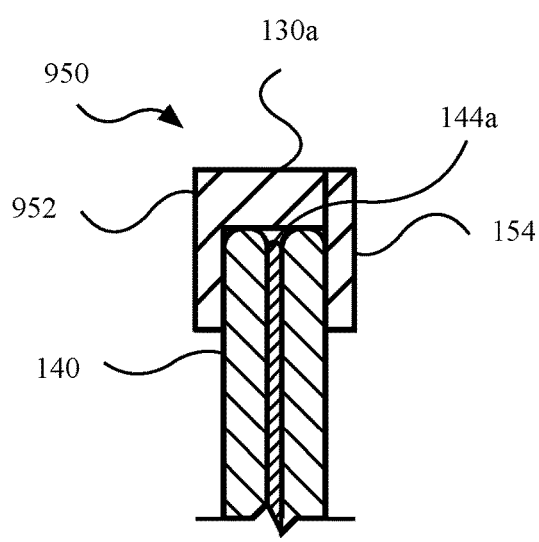
FIG. 9 is a cross-sectional view of another embodiment of a window assembly.

Referring to FIG. 9, any of the reinforcement structures 150, 250, 350, 450, 550 may form the window assembly with an upper edge 130a that is thicker than the laminated panel coupled thereto. For example, a reinforcement structure 950 is configured similar to the reinforcement structure 150. The reinforcement structure 950 includes a first structural member 952 and the second structural member 154. As compared to the first structural member 152, the first structural member 952 omits the outer portion 152b of the first structural member 152, which would otherwise decrease to the thickness of the laminated panel 140. Similarly, the reinforcement structure 250 may omit the outer portion 254c of the external member 254. The reinforcement structures 350, 450, 550 may instead be thicker than described above, so as to be thicker than the laminated panels coupled thereto. As a result, the seal 120 may have a different configuration (e.g., defining a wider channel or recess) to receive the upper edge 130a with greater thicknesses.

Each of the variations described above with respect to FIGS. 6-9, while described separately, may be used in any suitable combination with each other and the reinforcement structures 150, 250, 350, 450, and 550 described previously.

As described above, the window assemblies 130, 230, 330, 430, and 530 and variations thereof may have an upper edge 130a that has approximately the same thickness as the laminated panel thereof (e.g., 140). Using the window assembly 130 as an example, the window assembly 130 may engage the window frame 112 (e.g., the seal 120) in the same manner as a conventional window having glass material that engages the window frame 112. The window assembly 130 may, thereby, be used as a suitable replacement for the conventional window, such as to retrofit the vehicle 100, without requiring modification of the window frame 112 (e.g., replacing the seal 120). Accordingly, a method for providing a window assembly for a vehicle includes installing a window assembly having a reinforcement structure (e.g., one of the window assemblies 130, 230, 330, 430, 530 with reinforcement structures 150, 250, 350, 450, 550 and variations thereof) into a vehicle. The window assembly engages a window frame of the vehicle, such as a seal thereof, in the same manner as a conventional window without the reinforcement structure. The method may further include removing a previously-installed side window from the vehicle, which is the conventional window.

What is claimed is:

1. A window assembly for a vehicle comprising:
   a laminated panel having a first thickness and having a glass layer and a polymer layer that is laminated with the glass layer; and
   a reinforcement structure extending along and coupled to an upper perimeter of the polymer layer, the reinforcement structure comprising:
   a first section positioned outward of the laminated panel, forming an upper edge of the window assembly, and having the first thickness; and
   a second section positioned inward of the first section,
   wherein the reinforcement structure is configured to hold the polymer layer in tension to hinder inward movement of the polymer layer relative to the upper edge of the window assembly when the laminated panel experiences an outboard force,
   wherein the window assembly is a retractable side window assembly, and
   wherein only the first section of the reinforcement structure is receivable in a channel of a seal of the vehicle.

2. The window assembly according to claim 1, wherein the second section of the reinforcement structure has a second thickness that is greater than the first thickness.

3. The window assembly according to claim 2, wherein the first section of the reinforcement structure extends adjacent to the glass layer, and wherein the second section of the reinforcement structure extends along a surface of the glass layer.

4. The window assembly according to claim 1, further comprising another glass layer that is laminated to the polymer layer opposite from the glass layer.

5. The window assembly according to claim 1, wherein the reinforcement structure is coupled to the polymer layer via the glass layer.

6. The window assembly according to claim 1, wherein the reinforcement structure is coupled to the polymer layer independent of the glass layer.

7. The window assembly according to claim 1, wherein the polymer layer extends outward beyond the glass layer toward the upper edge of the window assembly.

8. The window assembly according to claim 7, wherein the laminated panel includes another glass layer that extends outward beyond the glass layer toward the upper edge.

9. The window assembly according to claim 1, wherein upon application of the outboard force to the laminated panel and an inboard force to the reinforcement structure, the reinforcement structure holds the polymer layer in tension between a forward portion, an upper portion, and a rearward portion of the upper perimeter of the upper edge.

10. The window assembly according to claim 1, wherein the reinforcement structure is formed of at least one of a metal material or a fiber-composite material.

11. A vehicle system comprising:
- a frame defining a window opening and having a seal that defines a channel extending along an upper perimeter of the frame; and
- a window assembly movable between a raised position and a lowered position, the window assembly comprising:
  - a glass and polymer layer having a first thickness; and
  - a reinforcement structure coupled to and extending along an upper perimeter of the glass and polymer layer, the reinforcement structure comprising:
    - a first section positioned outward of the upper perimeter and having the first thickness; and
    - a second section positioned inward of the upper perimeter and having a second thickness greater than the first thickness,
  - wherein in the raised position, only the first section of the reinforcement structure is positioned in the channel of the seal.

12. The vehicle system according to claim 11, wherein when the window assembly is in the raised position, the seal extends adjacent to the second section of the reinforcement structure.

13. The vehicle system according to claim 12, wherein when the window assembly is in the raised position, the seal retains the first section of the reinforcement structure in the channel upon application of a lateral force against the window assembly.

14. The vehicle system according to claim 12, wherein the reinforcement structure includes a structural member that is coupled to the polymer layer along the upper perimeter of the polymer layer, the structural member being formed of a metal or a fiber composite.

15. The vehicle system according to claim 14, wherein the structural member is coupled to the polymer layer independent of the glass layer.

16. The vehicle system according to claim 14, wherein the structural member is indirectly coupled to the polymer layer with the glass layer.

17. The vehicle system according to claim 11, wherein the reinforcement structure holds the polymer layer in tension upon application of an outboard force against the window assembly.

18. The vehicle system according to claim 17, wherein the outboard force is applied by an impactor having a mass of 18 kg and a velocity of between 16 km/h and 20 km/h.

19. A method comprising:
- installing into a vehicle a retractable side window assembly within a window frame, the retractable side window assembly having:
  - a glass and polymer layer, and
  - a reinforcement structure coupled to the glass and polymer layer and forming an upper edge of the retractable side window assembly,
    - an inner portion of the reinforcement structure extending along opposing surfaces of the glass and polymer layer,
    - an outer portion of the reinforcement structure extending outward from the glass and polymer layer to form the upper edge,
    - the upper edge having a thickness approximately equal to a thickness of the glass and polymer layer, and
    - only the outer portion being engageable within a channel of a seal in the window frame of the vehicle.

20. The method according to claim 19, further comprising removing a previously-installed retractable side window from the vehicle, the previously-installed side window including a glass panel that forms an upper edge engageable within the channel of the seal in the window frame of the vehicle.

* * * * *